3,405,094
PROCESS FOR STABILIZING ALDEHYDE
POLYMERS
Atsushi Tanaka, Yukio Hozumi, Shigetaka Endo, and Kotaro Taniguchi, Iruma-gun, Saitama-ken, Japan, assignors to Dai Cellu Kabushiki Kaisha, a corporation of Japan
No Drawing. Filed Apr. 20, 1964, Ser. No. 361,282
Claims priority, application Japan, Apr. 30, 1963, 38/22,243
6 Claims. (Cl. 260—67)

ABSTRACT OF THE DISCLOSURE

A process for stabilizing an aliphatic aldehyde polymer by removing organometallic polymerization catalyst contained in the polymer by adding a chelating agent such as acetylacetone, benzoylacetone or ethylaceto acetate to the pulverized polymer in a solvent and thereafter contacting the resulting polymer with a solution containing a diamine.

---

The present invention relates to a process for the production of stabilized aliphatic aldehyde polymers having a polyether structure.

It is well known that alipahtic higher aldehydes such as acetaldehyde may be polymerized by a catalyst selected from the group consisting of organometallic compounds of metals belonging to Groups I–III of the Periodic Table or from their alkoxides, to crystalline high molecular polymers having a polyether structure. However, the thus prepared aliphatic aldehyde polymers are unstable, susceptible to degradation even at room temperature and gradually depolymerize to release monomers. When the polymers are heated at a temperature above 100° C., depolymerization takes place quickly and the polymers disappear releasing monomers completely in a short period. Accordingly, research has been made in order to improve such instability of polyaldehydes, but satisfactory results have heretofore not been obtained.

On the other hand, various processes for stabilizing polyoxymethylene polymers prepared by the polymerization of formaldehyde have been proposed. Polymeric materials which had been stabilized by said processes have been supplied commercially in the market as materials for molding plastics. Even though the stabilizing processes employed for the stabilization of polyoxymethylene had been applied superficially to aliphatic higher aldehyde polymers, remarkable improvements in stability could not be attained. Therefore, it was presumed that the degradation mechanism of those higher aldehyde polymers is different from that of polyoxymethylene. As mentioned above, stabilization of aliphatic higher aldehyde polyether polymers, which is the object of the present invention, is a very difficult problem, but when solved enables production of commercially valuable polymers.

The instability of polymers of aliphatic higher aldehydes, such as acetaldehyde, may be partly due to the considerable amount of the metallic components, derived from the catalyst used in the polymerization, remaining in the polymer. Accordingly, the present inventors have studied the possibility of increase of the stability of those aldehyde polymers by eliminating such metallic components reducing the stability of the polymer as described above.

In short, the present invention relates to a process for removing the metallic components of the polymerization catalyst remaining in the polymer by treating the polymers in a solvent with a chelating agent such as acetylacetone or benzoylacetone and treating the resulting polymers with a solution containing amine compounds to stabilize the polymers.

Aldehyde polymers employed in the process of the present invention include the homopolymers of aliphatic aldehyde represented by the general formula RCHO in which, R is an alkyl group of 1 to 8 carbon atoms, e.g. acetaldehyde, propionaldehyde, n-butyraldehyde, isobutyraldehyde, and copolymers of these aldehydes. Copolymers with excellent swelling property and/or solubility in organic solvent may be produced from a mixture of two or three aldehyde monomers by properly selecting the polymerization catalyst. Copolymers of this type are also suitably submitted to the process of the present invention.

In the process of the present invention, the chelating agent is acetylacetone, benzoylacetone, ethylacetoacetate or the like. Preferred methods for reducing the ash content in the polymer in the process of the present invention does not always require making a homogeneous system by swelling or dissolving the polymers by use of suitable solvents. The present invention may be carried out in a heterogeneous system prepared by pulverizing the polymers and suspending the polymers in a suitable medium. Many organic solvents such as acetone, toluene, methanol and the like can be used as said medium. It is not necessary that the solvent be anhydrous, but the presence of water in an amount of more than a certain degree reduces the desalting effect. Accordingly, the water content must be adjusted properly depending upon the treatment condition.

The temperature is properly selected in the range above room temperature, and reflex temperature of acetone, or methanol. The amount of the chelating agent is suitably of the order of 0.1–5 gr., based on 1 gr. of aldehyde polymer. The solvent is used in an amount of about 1 to 30 times of the weight of polymer. Its preferred amount may be varied in accordance with the form of the aldehyde polymers, the temperature, and the type of treating procedure. The preferable time of treatment at acetone refluxing temperature is selected in the range of from 1 to 10 hours. Thus, polymers treated with a solvent containing a chelating agent are filtered off. They are purified by washing well with acetone or the like, to yield a polymer reduced in its content of residual catalyst.

The treatment with a solution containing an amine compound, following the treatment with the chelating agent, is effectively carried out in order to neutralize any chelating agent which might have remained in the purified polymer and which would accelerate depolymerization in air and prevent oxidation of those polymers which are susceptible to oxidation. Through those treatments, synergistic improvements in stability of polymers are obtained. Amine compounds to be used in this step include aromatic and aliphatic primary diamine compounds, such as benzidine, 1,5-naphthylene diamine, methaphenylene diamine, methylene diamine, trimethylene diamine, hexamethylene diamine and the like, and aromatic secondary diamine compounds such as N,N'-diphenylethylene diamine, N,N'-methylene-di-p(or o)-toluidine and the like. Many organic solvents may be used as the medium for carrying out this treatment. Acetone is usually employed. The treatment with a solution containing amine compounds is carried out by dipping the polymers in a solution is an amount of 2–30 times as much as the polymers by weight at a temperature ranging from room temperature to 60° C. for 2 to 20 hours. The amount of the amine compound is not critical, and suitably may be in a concentration of 0.1–1%, based on the solvent.

The thus prepared colorless or white polymers show improved stability, and do not color under heating even at 105° C. in air. If some thermal stabilizer is incorporated therein, the synergistic effect of stabilization is attained, and a very desirable stability can be obtained, which exhibits the extreme effect of the present invention.

Thermal stabilizers which may be employed include, for example, polyamide compounds soluble in organic solvents having an amine value of 100±40. Especially suitable are mixtures of the polyamide compounds with N,N'-diphenylethylene diamine and these are preferred. There are various methods for incorporating the stabilizing agent into the polymers, for example, a method comprising dissolving or swelling the polymers into a suitable solvent, adding a stabilizing agent therein, followed by mixing and removal of the solvent; a method comprising adding a stabilizing agent into molten polymers; and a method comprising mixing a stabilizing agent with solid polymers by means of an appropriate mixer.

An improved effect may be obtained when the polymers are dipped in ammoniacal methanol after polymerization prior to being submitted to the procedure of this invention. In this case, the ammoniacal methanol is cooled to below 0° C., preferably to −60−−70° C., and then added to the polymerization system which is kept at a considerably low temperature. Thereafter, the polymer obtained is separated and, without drying, is subjected to the treatments in the process of the present invention. Thereby a polymer having excellent stability may be obtained.

In summary, the present invention relates to a process for producing aldehyde polymers having excellent stability which comprises treating aliphatic aldehyde polymers with a chelating agent in the presence of a solvent to remove from the polymers any metallic components which are present from the polymerization catalyst, and dipping the resulting polymers in a solution containing an amine compound to increase the effect of the stabilizing agent to be incorporated.

The present invention is explained by the following examples.

EXAMPLE 1

30.4 gr. of a mixed monomer consisting of acetaldehyde and n-butyraldehyde in a molar ratio of 4:6 were added to 60 cc. of n-hexane. Then, 1.5 molar percent and 0.5 molar percent, based on the monomer mixture, of diethyl zinc and aluminum isopropoxide, respectively were added therein as catalysts. Polymerization was carried out at −78° C. for 20 hours. About 18 gr. of copolymer was obtained by the polymerization under said conditions. In this example, the product was divided into about four equal portions immediately after completion of the polymerization. Thereafter, the following treatment was carried out thereon.

(1–A–1): About 50 cc. of methanol cooled at −60° C. was added to the polymerization product kept at a reaction temperature. The temperature of the mixture was gradually raised to room temperature and kept at this temperature. After 48 hours, the polymers was filtered, washed with a small amount of methanol, then with water and dried at 40–50° C. under a reduced pressure.

(1–B–1): The polymerization product was maintained at the reaction temperature. To this product about 50 cc. of 4% ammoniacal methanol cooled to −60° C. was added. The temperature of the mixture was gradually raised to room temperature. After standing for 48 hours, the polymer was filtered, washed with a small amount of methanol, washed again with water and dried at 40–50° C. under a reduced pressure.

(1–A–2): After being submitted to the treatment with methanol and washing in the same manner as in (1–A–1), the polymers were dispersed in 50 cc. of an acetone solution containing 4 cc. of acetylacetone. The polymers were separated after heating under reflux for 4 hours. The separated polymers were washed with acetone several times, dipped in 30 cc. of an acetone solution containing 0.5% of N,N'-diphenylethylenediamine, and left to stand at room temperature for about 15 hours. Then, the resulting polymers were filtered and dried under a reduced pressure.

(1–B–2): The polymers are treated with ammoniacal methanol, followed with washing with methanol in the same manner as in (1–B–1) and treated by the same procedure as in (1–A–2) and dried under a reduced pressure.

(1–A–3): 0.5 gr. of dried polymer prepared in (1–A–2) was dipped in 25 cc. of a toluene solution containing 0.1% of polyamide (Lackamide–N–153) and 0.06% of N,N'-diphenylethylenediamine, and left to stand at room temperature for about 1 day. Then, the polymer was filtered and dried under a reduced pressure.

(1–B–3): 0.5 gr. of the dried polymer prepared in (1–B–2) was treated by the same operation as in (1–A–3), and dried under a reduced pressure.

The ash content in the polymers and the weight loss of the polymers as a result of heating in air at 105° C. were measured. The results are shown in the following table.

TABLE 1

| Treatment | Ash content, percent | Loss of weight (percent) After 1 hr. | Loss of weight (percent) After 10 hrs. | Color of polymers after heating for 10 hours |
|---|---|---|---|---|
| 1–A–1 | 1.81 | 6.7 | 40.8 | Yellowish brown. |
| Present invention: | | | | |
| 1–A–2 | 0.07 | 13.0 | 23.9 | Colorless. |
| 1–A–3 | | 0.5 | 1.9 | Pale yellow. |
| 1–B–1 | 1.14 | 5.6 | 43.4 | Yellowish brown. |
| Present invention: | | | | |
| 1–B–2 | 0.08 | 2.1 | 3.0 | Colorless. |
| 1–B–3 | | 0.2 | 0.5 | Slightly pale yellow. |

EXAMPLE 2

0.25 mol of a monomer mixture consisting of acetaldehyde and n-butyraldehyde in a molar ratio of 6:4 was polymerized by adding 4 millimols of diethyl aluminum (diphenyl) amide as a catalyst. Polymerization was carried out in toluene and the polymer was treated by the procedure as described in (1–B–1). About 6 gr. of copolymers soluble in toluene was obtained (2–A–1).

(2–B): 3 gr. of the dried copolymers prepared in (2–A–1) were added to a mixture solution consisting of 9 cc. of acetylacetone and 80 cc. of acetone and heated under reflux for 6 hours. The resulting copolymers were collected, washed with acetone, treated by the processes of (1–A–2) and (1–A–3) described in Example 1, and dried under a reduced pressure. The influence of the time of treatment with acetylacetone is shown in the following Table 2.

TABLE 2

| Time of treatment with acetylacetone (hr.) | Ash content in the polymer (percent) | Viscosity of the polymer [η] 30° C. toluene |
|---|---|---|
| 0 | 1.99 | 16.5 |
| 1 | | 16.2 |
| 4 | 0.30 | 16.7 |
| 6 | 0.003 | 16.1 |

(2–A–2): Copolymers prepared in (2–A–1) were treated by the process of (1–A–3) in Example 1, and dried under a reduced pressure.

Weight losses and viscosity changes of the polymers obtained by the procedures in (2-A-1), (2-A-2) and (2-B), by heating at 105° C. and 150° C. in air, were measured, respectively.

The results are shown in Table 3.

TABLE 3

| Treatment | Ash (percent) | 30° C. [η] toluene | Weight loss at 105° C. (percent) | | Heating at 150° C., for 1 hour | |
|---|---|---|---|---|---|---|
| | | | 1 hr. | 10 hrs. | Weight loss (percent) | 30° C. [η] toluene |
| 2-A-1 | 0.99 | 16.5 | 4.0 | 13.3 | 95.7 | 2.3 |
| 2-A-2 | | | 3.8 | 9.1 | 17.5 | 10.1 |
| 2-B [1] | 0.003 | 16.1 | 1.8 | 6.6 | 2.8 | 11.1 |

[1] The present invention.

EXAMPLE 3

(3-A-1): 2.5 millimoles of aluminum isopropoxide, 5 millimoles of diethyl zinc, and 1 millimol of N,N'-diphenylethylenediamine were mixed in 60 cc. of n-hexane. The mixture was heated under a nitrogen atmosphere for a short time. After cooling down to −78° C., 0.5 mol of a monomer mixture consisting of acetaldehyde and n-butyraldehyde in the molar ratio of 4:6 was added therein. The polymerization was carried out at −78° C. About 10 gr. of copolymers which were swollen in toluene were obtained.

(3-B): Copolymers prepared in (3-A-1) were dried well. 2 gr. of the dried copolymers prepared in (3-A-1) was added to a solution consisting of 2 cc. of acetylacetone and 80 cc. of acetone. The mixture was heated under reflux for 7.5 hours. The resulting polymers were filtered, washed with acetone, treated by the same operations as in (1-A-2) and (1-A-3) in Example 1, and dried under a reduced pressure.

(3-A-2): For comparison with polymers obtained in (3-A-1) and (3-B), polymers prepared in (3-A-1) were treated by the same process as in (1-A-3), and dried under a reduced pressure. The thermal stabilities of these polymers in air are shown in Table 4.

TABLE 4

| Treatment | Ash content (percent) | Weight loss (percent) by heating at 105° C. | |
|---|---|---|---|
| | | 1 hr. | 10 hrs. |
| 3-A-1 | 0.94 | 8.4 | 20.9 |
| 3-A-2 | | 0.5 | 1.4 |
| 3-B | 0.34 | 0.3 | 0.8 |

When the same treatments as in (3-B) were conducted except that 2 gr. of benzoyl acetone was used instead of 2 cc. of acetylacetone, ash content was reduced to 0.6%.

EXAMPLE 4

60 cc. of n-hexane containing the catalyst were cooled under a nitrogen atmosphere, and monomers (listed separately hereafter) were added therein. Polymerization was carried out at −78° C. for 20 hours. After completion of the polymerization, 4% ammoniacal methanol cooled at −60° C. was added to the polymeric product, while maintaining the product at the reaction temperature. The temperature of the mixture was raised gradually to room temperature. After standing for 24 hours, the polymers were filtered, and washed with a small amount of methanol and acetone. One part of the resulting polymers was taken out and dried under a reduced pressure without further treatment. Most of the remaining polymers were dispersed in almost the same amount of acetone containing acetylacetone in the same amount as polymer to be treated and heated under reflux for 8 hours. Thereafter, the polymers were separated, treated with a N,N'-diphenylethylenediamine solution, and dried under a reduced pressure. Polymers treated with acetylacetone contained a remarkably reduced amount of ash, compared with polymers which were not treated. The results are shown in Table 5.

TABLE 5

| Monomer | Catalyst | Amount of the catalyst, mol percent | Ash content (percent), Acetylacetone treatment | |
|---|---|---|---|---|
| | | | Treated | Untreated |
| AA 0.5 mol | ZnEt$_2$-Al(OR)$_3$(3:1) | 2 | 3.7 | 0.25 |
| AA 0.5 mol | ZnEt$_2$-Al(OR)$_3$(3:1) | 4 | 16.0 | 0.14 |
| BA 0.5 mol | ZnEt$_2$-Al(OR)$_3$(3:1) | 2 | 3.1 | 0.11 |
| AA 0.2 mol plus BA 0.3 mol | ZnEt$_2$-Al(OR)$_3$(3:1) | 2 | 1.1 | 0.03 |
| AA 0.2 mol plus BA 0.3 mol | AlEt$_3$ | 1.47 | 1.1 | <0.01 |

AA = acetaldehyde; BA = n-butyraldehyde.

Yield of a homopolymer after treatment with acetylacetone is 40–60% and that of a copolymer is 85–95%.

What we claim is:

1. A process for producing stable polymers of an aliphatic aldehyde represented by the formula RCHO, wherein R is an alkyl group of 1 to 8 carbon atoms, said polymer having a crystalline polyether structure, said process comprising pulverizing a polymerization product mixture of a solid, resinous polymer of said aldehyde and an organometallic polymerization catalyst, after deactivation of the catalyst, suspending the pulverized product in an organic solvent containing a chelating agent which is soluble in said organic solvent to remove the catalyst residues from said polymerization mixture, said solvent being present in an amount between 1 and 30 times the weight of the polymer, the chelating agent being acetylacetone, benzoylacetone, or ethylacetoacetate, and being present in the solvent in an amount between .1 and 5 times the weight of polymer, and thereafter contacting the resulting polymer with 2–30 times by weight of a solution containing an amine compound selected from the group consisting of aromatic and aliphatic primary diamines and aromatic secondary diamines in a concentration of 0.1–1% at a temperature from room temperature to 60° C.

2. The process of claim 1, wherein the aliphatic aldehyde polymer is a homopolymer of acetaldehyde.

3. The process of claim 1, wherein the aliphatic aldehyde polymer is a copolymer of acetaldehyde and n-butyraldehyde produced from a monomer mixture in a molar ratio of from 9:1 to 1:9 of acetaldehyde to n-butyraldehyde.

4. The process of claim 1, wherein the polymer and the chelating agent are subjected to reaction in the common organic solvent which results in the formation of a homogeneous solution, a swollen system or heterogeneous suspension system.

5. The process of claim 4, wherein said common solvent is methanol, acetone, chloroform, benzene, toluene, or xylene.

6. The process of claim 1, wherein said amine compound is N,N'-diphenylethylenediamine.

(References on following page)

References Cited

UNITED STATES PATENTS

| | | | |
|---|---|---|---|
| 2,989,509 | 6/1961 | Hudgin et al. | 260—67 |
| 3,208,975 | 9/1965 | Vandenberg | 260—67 |
| 3,216,972 | 11/1965 | Sidi | 260—67 |
| 2,920,059 | 1/1960 | MacDonald et al. | 260—67 XR |
| 3,350,358 | 10/1967 | Hagemeyer et al. | 260—67 |

WILLIAM H. SHORT, *Primary Examiner.*

L. M. PHYNER, *Assistant Examiner.*